United States Patent [19]

Simic

[11] 4,026,719
[45] May 31, 1977

[54] SULFUR COMPOSITION WITH MICA
[75] Inventor: Milutin Simic, Novato, Calif.
[73] Assignee: Chevron Research Company, San Francisco, Calif.
[22] Filed: Nov. 13, 1975
[21] Appl. No.: 631,781

Related U.S. Application Data

[63] Continuation-in-part of Ser. No. 529,258, Dec. 3, 1974, abandoned.

[52] U.S. Cl. .................................. 106/287 SC
[51] Int. Cl.² .................... C07G 17/00; C09K 3/00
[58] Field of Search .................... 106/287 SC, 287; 260/79

[56] References Cited

UNITED STATES PATENTS

| | | | |
|---|---|---|---|
| 3,316,115 | 4/1967 | Barnes | 106/287 SC |
| 3,453,125 | 7/1969 | Williams | 106/19 |
| 3,823,019 | 7/1974 | Dale et al. | 106/287 SC |

*Primary Examiner*—Theodore Morris
*Attorney, Agent, or Firm*—Dix A. Newell; John Stoner, Jr.; W. Keith Turner

[57] ABSTRACT

A composition containing sulfur, a sulfur plasticizer and mica. The composition is surprisingly strong even without glass fiber in the composition. The composition can be used as a coating formulation or as a binder.

9 Claims, No Drawings

SULFUR COMPOSITION WITH MICA

CROSS-REFERENCE TO RELATED APPLICATION

This application is a continuation-in-part of U.S. application Ser. No. 529,258, filed Dec. 3, 1974 now abandoned, the disclosure of which application is incorporated by reference herein.

BACKGROUND OF THE INVENTION

The present invention relates to a composition containing plasticized sulfur, in particular a composition which is useful for coating walls or for consolidating soil or for forming a layer of material useful in various ways as, for example, in construction.

Plasticized sulfur mixtures are disclosed in various references. For example, J. I. Jin gives the following tabular comparison of plasticized sulfur compositions in his report given at the ACS Los Angeles meeting, Symposium on New Sulfur Chemistry, Apr. 19, 1974, page 235:

TABLE I
COMPARISON OF PLASTICIZED SULFUR COMPOSITIONS

| Plasticizer | Melt Viscosity Regulator | Reference |
|---|---|---|
| Mixture of dithio and higher thiols | Chlorinated Polyphenyls | (2) |
| Atylenepolysulfide (ZM:399)* and aliphatic polysulfide (LP-3)** | None | (3.6) |
| H—(SCH$_2$CH(OH)—CH$_2$S)—$_n$H and styrene | Diphenyl dithiophosphate | (4) |
| Dithiol | Monomercaptan | (5) |

*Thiokol's styrene polysulfide
**Thiokol's liquid polysulfide
(2) Louthan, R. P., U.S. Patent 3,434,852 (March 1969).
(3) Barnes, M. D., U.S. Patent 3,316,115 (April 1967).
(4) Signouret, J. B., U.S. Patent 3,560,451 (February 1971).
(5) Kane, J. C., U.S. Patent 3,447,941 (June 1969).
(6) Dale, J. M., Report No. 1 (Sept. 1961); Report No. 2 (April 1962); Report No. 3 (June 1963), Project 1092-2, Southwest Research Institute.

Other reports of interest given at the above ACS Symposium on New Sulfur Chemistry include that by B. R. Currell et al, "Plasticization of Sulphur," which report was concerned with a study of the chemical interaction of additives (such as polymeric polysulfides, unsaturated hydrocarbons and phenolic derivatives) with sulfur and also measurement, using differential scanning calorimetry and electron microscopy, of the rate of crystallization of sulfur in the presence of these additives. Limonene, myrcene, dicyclopentadiene and cycloocta-1,3-diene were found particularly effective in retarding sulfur crystallization. Other reports at the ACS Symposium of interest include that by T. A. Sullivan et al, "The Use of Sulfur in Coatings and Structural Materials." The Sullivan et al report described use of a sulfur formulation in construction of a cinder block building where the blocks were stacked dry and bonded together by spraying with the formulation.

U.S. Pat. No. 3,453,125 describes modifiers to reduce the viscosity of plasticized sulfur. According to the patent the viscosity of plasticized sulfur compositions comprising elemental sulfur plasticized with an organic sulfur-plasticizing agent is reduced by the addition of a modifying amount of a persulfide of the formula:

A—R—S$_x$—R—A wherein each R is a hydrocarbon radical having up to about 10 carbon atoms, at least one A is hydroxyl or carboxyl and $x$ is an integer of from 2 to about 5.

U.S. Pat. No. 3,316,115 describes plasticized sulfur marking compositions useful for marking roads and the like. The composition comprises a major amount of sulfur plasticized with at least one polysulfide polymer. The polysulfide plasticizer, according to the patent, may be (1) an aryl polysulfide wherein the bridging links between adjacent sulfur atoms in the polymer chain include an aromatic radical; and/or (2) an aliphatic polysulfide wherein the bridging links between adjacent sulfur atoms in the polymer chain include aliphatic ether linkages, e.g. ——CH$_2$OCH$_2$OCH$_2$—— and the like.

U.S. Pat. No. 3,306,000 describes a method of bonding building blocks without the use of any bonding medium on the contacting surfaces between the building blocks. According to the method a plasticized sulfur composition is coated on the external surfaces of the stacked building blocks. The plasticized sulfur composition consists essentially of sulfur, a polysulfide plasticizer and glass fibers. Preferred plasticizers are aryl polysulfides and aliphatic polysulfides. Aryl polysulfides are exemplified by styrene polysulfide which has been available as Thiokol polymer ZM-399. Aliphatic sulfides are exemplified in the No. 3,306,000 U.S. Patent by Thiokol LP-3 which contains ether linkages and has the recurring unit:

——S$_x$CH$_2$CH$_2$OCH$_2$OCH$_2$CH$_2$S$_x$—— where $x$ has a value of 4.

U.S. Pat. No. 3,674,525, entitled "Plasticized Sulfur Compositions" is directed to a plasticized sulfur composition comprising sulfur plasticized with an organic sulfur plasticizing agent wherein the plasticized sulfur viscosity is reduced by the addition of an unsaturated acid to the plasticizing agent prior to its use for plasticizing sulfur. At column 3 of the '525 patent, it is indicated that various fillers can be included in the plasticized sulfur. Thus the patent states:

Any filler can be employed in the preparation of plasticized compositions. In some instances, the fillers also can serve as extender pigments. Preferably, the filler is added to the plasticized sulfur containing the modifier of this invention. Thorough mixing of the filler with the plasticized sulfur is readily achieved by stirring at temperatures at which the plasticized sulfur is molten. Less preferably, the filler can be added to the sulfur and/or to the plasticizer prior to plasticizing of the sulfur.

Fillers suitable for use in the plasticized compositions are selected from a group consisting of silica, bentonite, china clay, titanium dioxide, barium sulfate, barium carbonate, calcium carbonate, calcium sulfate, magnesium silicate, magnesium oxide, magnesium carbonate, graphite, carbon black, glass fibers, metal powders, asbestos, wood flour, cotton floc, alpha cellulose, mica, pyrophyllite, pumice, diatomite, alumina hydrate, calcium silicate, and the like.

The filler is present in the range of from about 1 to about 50 parts by weight per 100 parts by weight of plasticized sulfur.

U.S. Pat. No. 3,823,019 is directed to a composition comprising sulfur, dicyclopentadiene, glass fiber and talc.

My related patent application Ser. No. 518,438 is directed to a composition comprising sulfur, a sulfur plasticizer, a dispersing agent, and asbestos fibers of a specified mix. My related application Ser. No. 601,552 is directed to a composition comprising at least 50 weight percent sulfur, a sulfur plasticizer, and an aromatic polysulfide wherein the polysulfide is formed by reacting one mol of an aromatic carbocyclic or heterocyclic compound, substituted by at least one functional group of the class —OH or —NHR in which R is H or lower alkyl, with at least two mols of sulfur.

SUMMARY OF THE INVENTION

According to the present invention a composition is provided which comprises 50–98 weight percent sulfur, 0.2 to 20 weight percent sulfur plasticizer, and 1 to 40 weight percent mica.

Preferably the amount of mica in the composition is 5 to 20 weight percent. The weight percents are based on the total weight of the composition.

Among other factors the present invention is based on my finding that the plasticized sulfur containing mica in accordance with the present invention performs unexpectedly well compared to other plasticized sulfur compositions not containing mica. The composition of the present invention is useful in water impoundment; in providing floors and slabs resistence to abusive foot traffic, corrosive chemicals, and the like; in lining irrigation ditches; and in consolidating and retaining in place earth, such as on embankments, to prevent erosion. The strength of the composition is important in most of these services. Compared to somewhat similar formulations of plasticized sulfur compositions, I have found strength improvements of 25 to 200 percent and more when using mica as opposed to the use of other inorganic fillers. Also very surprisingly I have discovered that formulations of plasticized sulfur with mica in accordance with the present invention have substantially equal strength characteristics compared to similar formulations containing glass fiber in addition to mica, and that formulations in accordance with the present invention containing mica without glass fiber have generallly equal or greater strength characteristics then formulations containing glass fiber or both glass fiber and talc instead of mica. This unpredictable advantage which I have found for mica in plasticized sulfur compositions is especially advantageous in view of the cost difference between mica and glass fiber. Mica costs typically run in the vicinity of 3 cents per pound whereas glass fiber is typically about 50 cents per pound. Thus the advantage to use of the formulation of the present invention over previous proposed formulations containing glass fiber (for example, the sulfur, dicyclopentadiene, glass fiber and talc formulation of U.S. Pat. No. 3,823,019) can readily be seen.

Thus, although various fillers, including glass fibers, can be included in the mica-containing composition of the present invention, according to a preferred embodiment of the present invention a plasticized sulfur composition of attractive strength characteristics is provided wherein the composition comprises sulfur plus a sulfur plasticizer and mica and wherein there is no glass fiber in the composition. According to a particularly preferred embodiment of the present invention, the composition consists essentially of sulfur, a sulfur plasticizer and mica.

Sulfur is a major ingredient of the composition of the present invention and is present in amounts above about 50 weight percent, generally between about 60 and 98 weight percent and preferably between 70 and 97 weight percent. The sulfur may be present in the composition due to the sulfur in the sulfur plasticizer and aromatic polysulfide, but more usually the other ingredients are added to molten sulfur to form the composition. The composition is prepared in molten form at a temperature above the melting point of the composition, say, a temperature between about 110° C and 180° C, preferably between about 125° C and 150° C.

The composition is typically applied in the molten form as, for example, by spraying or painting onto the surface desired to be covered by the composition, preferably by spraying.

The composition of the present invention includes a sulfur plasticizer. A sulfur plasticizer is used to mean something that plasticizes sulfur or results in plasticized sulfur. In turn, "plasticized sulfur" as the term is used herein usually has a slightly lower melting point than elemental sulfur. Furthermore, plasticized sulfur requires a longer time to crystallize; i.e., the rate of crystallization of plasticized sulfur is slower than that of elemental sulfur. One useful way to measure the rate of crystallization is as follows: the test material (0.040 g) is melted on a microscope slide at 130° C and is then covered with a square microscope slide cover slip. The slide is transferred to a hot plate and is kept at a temperature of 78°±2° C, as measured on the glass slide using a surface pyrometer. One corner of the melt is seeded with a crystal of test material. The time required for complete crystallization is measured. Plasticized sulfur, then, is sulfur containing an additive which increases the crystallization time within experimental error, i.e., the average crystallization time of the plasticized sulfur is greater than the average crystallization time of the elemental sulfur feedstock. For the present application, plasticizers are those substances which, when added to molten elemental sulfur, cause an increase in crystallization time in reference to the elemental sulfur itself.

Inorganic plasticizers include iron, arsenic and phosphorus sulfides, but the particularly preferred plasticizers are organic compounds which react with sulfur to give sulfur-containing materials.

Sulfur plasticizers which are suitable include aliphatic polysulfides, aromatic polysulfides, styrene, dicyclopentadiene, dioctylphthalate, acrylic acid, epoxidized soybean oil, triglycerides, and tall oil fatty acids.

One class of preferred plasticizers is the aliphatic polysulfides, particularly those that will not form cross-linking. Thus butadiene is not a preferred constituent to form the aliphatic polysulfide, as it may form cross-linking sulfur bonds, whereas dicyclopentadiene is a preferred compound for forming the aliphatic polysulfide useful as the sulfur plasticizer. With molten sulfur, dicyclopentadiene forms an extremely satisfactory aliphatic polysulfide.

Another class of preferred plasticizers for use in the composition of the present invention are aromatic polysulfides formed by reacting one mol of an aromatic carbocyclic or heterocyclic compound, substituted by at least one functional group of the class —OH or —NHR in which R is H or lower alkyl with at least two mols of sulfur.

Suitable aromatic compounds of this type include: phenol, aniline, N-methyl aniline, 3-hydroxy thiophene, 4-hydroxy pyridine, p-aminophenol, hydroquinone, resorcinal, meta-cresol, thymol, 4,4'-dihydroxy biphenyl, 2,2-di(p-hydroxyphenol) propane, di (p-hydroxy phenyl) methane, etc., p-phenylene diamine, methylene, dianiline. Phenol is an especially preferred aromatic compound to form the aromatic polysulfide.

The aromatic polysulfides are generally prepared by heating sulfur and the aromatic compound at a temperature in the range of 120° to 170° C for 1 to 12 hours, usually in the presence of a base catalyst such as sodium hydroxide. (See for example, Angew, Chem. V.70, No. 12, pages 351–67 (1958). the polysulfide product made in this way has a mol ratio of aromatic compound:sulfur of the 1:2 to 1:10, preferably from 1:3 to 1:7. Upon completion of the reaction, the caustic catalyst is neutralized with an acid such as phosphoric or sulfuric acid. Organic acids may also be used for this purpose. The resulting aromatic polysulfide may be used immediately or it may be cooled and stored for future use.

Another type of aliphatic polysulfide useful as a plasticizer for this invention are the linear aliphatic polysulfides. Although these polysulfides may be used alone as the sulfur plasticizer, it is preferred to use them in combination with either (a) dicyclopentadiene or (b) the aromatic polysulfides described above, especially with the phenol-sulfur adduct. In this connection, the preferred plasticizer mixtures contain from 5 to 60% linear alipyatic polysulfide by weight based on total plasticizer, preferably about 10 to 30 weight percent.

These aliphatic polysulfides may have branching indicated as follows:

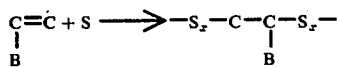

wherein $x$ is an integer of from 2 to 6 and wherein B is H, alkyl, aryl, halogen, nitrile, ester or amide group. Thus in this connection the aliphatic polysulfide is preferably a linear polysulfide. The chain with the sulfur preferably is linear, but it can have side groups as indicated by B above. Also, this side group B may be aromatic. Thus styrene can be used to form a phenyl substituted linear aliphatic polysulfide. The preferred aliphatic polysulfides of this type are both linear and non-branched.

Unbranched linear aliphatic polysulfides include those such as Thiokol LP-3 which contains an ether linkage and has the recurring unit:

wherein $x$ has an average value of about 12. The ether constituent of this aliphatic polysulfide is relatively inert to reaction. Other suitable aliphatic polysulfides have the following recurring units:

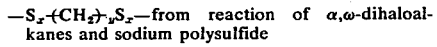
from reaction of $\alpha,\omega$-dihaloalkanes and sodium polysulfide

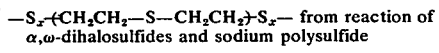
from reaction of $\alpha,\omega$-dihalosulfides and sodium polysulfide $-S_x\text{-}(CH_2CH_2-O-CH_2CH_2)\text{-}S_x-$ from reaction of $\alpha,\omega$-dihaloesters and sodium polysulfide wherein $x$ is an integer of 2 to 5; and $y$ is an integer of 2 to 10.

Preferred plasticizers for use herein include those disclosed in my commonly assigned application Ser. No. 601,552, especially the mixtures of aromatic and aliphatic polysulfides disclosed therein. The disclosure of Ser. No. 601,552 is incorporated herein by reference.

The quantity of sulfur plasticizer used in the present invention varies broadly from 0.05 to 25.0 percent by weight based on total weight of the composition. Preferably the amount used is in the range of 0.2 to 2.0 percent, and most preferably from 1 to 5.0 percent.

As is indicated above, mica is a critically important element of the composition of the present invention. The term "mica" is used herein to mean a layered silicate having an x-ray diffraction pattern $d$ spacing about 9.6 to 10.1 A, preferably a $d$ spacing of about 9.9 to 10.1 A. Talc material also is a layered silicate, but has a $d$ spacing of about 9.35 A. Satisfactory mica particles cover a very broad range of sizes. It is preferred that at least 90 percent pass through a 40-mesh (Tyler) screen. Satisfactory particles have sizes ranging in diameter from .001 to 2 mm and in thickness from 0.0005 to 0.2 mm.

Typical amounts of mica in the formulation are about 1 to 40 weight percent, preferably 5 to 30 weight percent, and particularly preferred amounts are 10 to 20 weight percent.

Preferred micas for use in the composition of the present invention are phlogopite, muscovite, zinnwaldite and biotite, which are natural micas, and fluorophlogopite and barium disilic, which are synthetic micas. Particularly preferred micas for use in the present invention contain potassium and have a chemical composition of $3Al_2O_3 \cdot K_2O \cdot 6SiO_2 \cdot 2H_2O$, also written $K_2AL_4 (AL_2Si_6O_{20}) (OH)_4$. Mica differs from talc in that talc typically does not contain potassium. Kirk-Othmer Encyclopedia of Chemical Technology, 2d Ed., Vol. 19, page 608, gives the following chemical formula for talc: $Mg_3SiO_{10} (OH)_2$.

As mentioned above, according to a preferred embodiment of the present invention, no glass fiber is included in the plasticized sulfur composition of the present invention. In this preferred embodiment other fillers may be included in the composition such as talc or asbestos or mixtures thereof in amounts of 0.1 to 20 weight percent. However, according to a preferred embodiment the other fillers are also omitted.

Aggregates, that is, gravels or rocks, or sand, may also be included in the composition of the present invention in amounts of 1 to 50 weight percent.

EXAMPLES

The attached Tables II and III show several plasticized sulfur compositions containing mica, or containing another filler and no mica, or, as in Table III, containing glass fiber either with mica or with a different filler.

Referring to Table II, in each case the mixture was made up to have about the same viscosity; namely, a highly viscose mixture that was still sprayable.

The sulfur coating compositions as shown in Table II were prepared by charging the indicated parts by weight of sulfur to a stainless-steel beaker. This sulfur was heated until molten at a temperature of about 145° C. Then the indicated parts of plasticizer were added to the stirred, molten sulfur, and the resulting mixture was heated until homogeneous, about one-sixth hour. Mica was added and the entire mixture was stirred and heated at the above temperature for 1 hour.

At the end of this time, the sulfur-containing composition was fashioned into test specimens as described in ASTM D-790-71 for the flexural test and ASTM D-1320-60T for the tensile test. These specimens were then tested for strength, and the results are given in Table II.

Referring to the Table II results, it is seen that the formulations with mica as in Examples 1, 6 and 7 gave excellent results. Example 7 illustrates not only the advantage of the use of mica in accordance with the present invention, but also illustrates a particularly preferred plasticizer for the present invention (a mixture of aromatic polysulfide with aliphatic-type polysulfide, especially phenol polysulfide adduct and Thiokol LP-3 ether linkage polysulfide), and also illustrates a particularly preferred amount of mica when mica is the sole filler (15 to 19 wt. %, especially about 17 wt. %).

Examples 2, 3, 4, 8, 9 and 10 have approximately comparable amounts of non-mica fillers versus examples 1, 6 and 7, yet these examples showed much poorer strength. Thus example 4 with 15 wt. % clay had a flexural strength about 50% less than Example 1 with 12 wt. % mica. Flexural strength is especially important to the composition of the present invention as it is related to the ability of the composition to furnish bridging strength over a hole or the like when the composition is used as a coating substance over a surface with some irregularities. Flexural strength is determined by disposing a beam-shaped specimen of the solidified plasticized sulfur composition between two support points and then applying a force to the specimen between the support points to determine at what point it yields and breaks.

Example 5 in Table II shows a composition wherein glass fibers were used instead of mica, although only three parts by weight glass fiber could be included, because when glass fibers were used alone the mixture was too lumpy to be a sprayable mixture even with just three weight percent glass fiber.

Referring now to Table III, the sulfur coating compositions as shown in Table III were prepared by charging the indicated parts by weight of sulfur to a stainless-steel beaker. This sulfur was heated until molten at a temperature of about 130° C. Then the indicated parts of sulfur plasticizer, which in this Table is dicyclopentadiene, were added to the stirred, molten sulfur, and the resulting mixture was heated until homogeneous, about one-sixth hour. Glass fibers and a fourth component (mica, talc or asbestos) were added and the entire mixture was stirred and heated at the indicated temperature for 1 hour.

At the end of this time, the sulfur-containing composition was fashioned into test specimens. These specimens were then tested for strength, and the results are given in Table III.

Examples 11, 12, 15, 16, 19 and 23 illustrate compositions having mica as the fourth component, in accordance with an embodiment of the present invention. Examples 13, 17, 22 and 24 illustrate compositions containing talc as the fourth component. A comparison of Example 13 to Examples 11 and 12, of Example 17 to Examples 15 and 16, of Example 22 to Example 19, and of Example 24 to Example 23 shows that replacement of talc with an equal quantity of mica results in a composition having improved values in strength properties. Furthermore, Examples 14 and 18, illustrating mixtures of talc and mica, have strength properties intermediate with those of talc and mica only. Examples 21 and 25 illustrate mixtures of mica and asbestos, and Example 20 illustrates a mixture of mica and expanded silica. A comparison of Example 20 with Example 19 shows improved flexural strength in compositions containing both mica and expanded silica.

In another set of tests, a concentrate was prepared by heating 3 parts by weight of molten sulfur with 2 parts of dicyclopentadiene for about 2–4 hours. Subsequently, 5 parts of this concentrate, 82 parts sulfur, 10 parts of mica and 3 parts of milled glass were added and the entire mixture was heated and stirred for one-half hour at 130°–140° C and then fashioned into test specimens as before. The composition containing mica had a flexural strength of 1430 (1100–1760) psi, whereas that containing talc had a flexural strength of 1300 (1110–1430) psi. This example illustrates the method of preparing a concentrate and then diluting the concentrate to form the final coating composition. In this case again, the mica-containing composition was superior to that containing talc.

Although these latter set of examples starting with Example 11 illustrate the advantage of using mica in a formulation which contains glass fibers as opposed to the use of a plasticized sulfur-glass formulation containing a non-mica filler, as previously indicated the most preferred embodiment of the present invention is one wherein no glass fiber is used at all in the plasticized sulfur composition. This is based on my finding that mica results in a surprisingly strong plasticized sulfur composition even with the exclusion of glass fiber.

To reduce possible hydrogen sulfide odors during the formulation of the sulfur compositions disclosed herein, charcoal, preferably activated charcoal, may be added to the formulation.

Table II

| Ex. No. | Sulfur % | Plasticizer Comp. Component(s) | % | Filler Type | % | Strength, psi Flexural | Tensile |
|---|---|---|---|---|---|---|---|
| 1 | 86 | DCP[1] | 2 | Mica | 12 | 2100 | 800 |
| 2 | 86 | DCP | 2 | Asbestos/Talc Mix[2] | 12 | 1300 | 1050 |
| 3 | 88 | DCP | 2 | Talc[3] | 10 | 570 | fn[4] |
| 4 | 83 | DCP | 2 | Clay[5] | 15 | 1100 | 670 |
| 5 | 95 | DCP | 2 | Glass[6] | 3 | 1100 | fn[7] |
| 6 | 86 | PSA | 2 | Mica | 12 | 1680 | 1000 |
| 7 | 80 | PSA LP-3[8] | 2 1 | Mica | 17 | 2100 | 1400 |
| 8 | 85 | PSA LP-3 | 2 1 | Asbestos/Talc Mix | 12 | 600 | 520 |
| 9 | 85 | PSA LP-3 | 2 1 | Talc | 12 | 300 | 450 |
| 10 | 76.5 | PSA LP-3 | 2 1 | $CaCO_3$ | 20.5 | 560 | 200 |
| 11 | 81 | DCP | 2 | Mica[10] | 17 | 1450 | 1200 |

Table II-continued

| Ex. No. | Sulfur % | Plasticizer Comp. Component(s) | % | Filler Type | % | Strength, psi Flexural | Tensile |
|---|---|---|---|---|---|---|---|
| 12 | 82 | DCP | 2 | Mica[11] | 16 | 1900 | 1250 |

[1]Dicyclopentadiene
[2]International Fiber No. 1
[3]Mistron Vapor
[4]Too brittle to measure
[5]Kaopague-30
[6]0.25" milled glass
[7]Too lumpy to test
[8]Linear aliphatic polysulfide sold by Thiokol Co.
[9]P-80-F mica sold by U.S. Gypsum, 30–40%   325 mesh
[10]C-3000 sold by English Mica Co., having a particle size of 5–10 microns by 0.5 micron
[11]C-1000 sold by English Mica, Co., having a particle size of 10–20 microns by 1.0 micron fatty acids; styrene; or an aromatic polysulfide formed by reacting one mol of an aromatic carbocyclic or a heterocyclic compound, substituted by at least one functional group of the class —OH or —NHR in which R is H or lower alkyl, with at least two mols of sulfur; or mixture of the foregoing plasticizers.

4. A composition in accordance with claim 1 wherein the plasticizer is dicyclopentadiene.

5. A composition in accordance with claim 1 wherein the plasticizer is an aromatic polysulfide formed by reacting one mol of phenol with at least two mols of sulfur.

6. A composition in accordance with claim 3 wherein the plasticizer is an aliphatic polysulfide polymer which has the reoccuring unit

TABLE III

SULFUR COMPOSITIONS

| Ex. No. | Sulfur, Parts | DCP,[1] Parts | Glass,[2] Parts | Fourth Component Kind | Parts | Temp., °C | Flex.,[3] psi | Tens.,[4] psi | Compres.,[5] psi | Shear,[13] psi |
|---|---|---|---|---|---|---|---|---|---|---|
| 1 | 85 | 2 | 3 | Mica[6] | 10 | 150 | 2050 (1540–2430) | 1170 (940–1420) | — | |
| 2 | 85 | 2 | 3 | Mica[7] | 10 | 150 | 2100 (1680–2580) | 1170 (1100–1240) | — | |
| 3 | 85 | 2 | 3 | Talc[8] | 10 | 150 | 1480 (1080–1860) | 650 (450–870) | — | |
| 4 | 85 | 3 | 3 | { Mica[9] / Talc[8] } | { 9 / 1 } | 150 | 1670 (1500–1990) | 940 (720–1100) | — | |
| 5 | 87 | 1.8 | 2.6 | Mica[6] | 8.6 | 150 | 1390 (890–1710) | 1000 (810–1360) | 6100 (5700–6300) | |
| 6 | 87 | 1.8 | 2.6 | Mica[7] | 8.6 | 150 | 1360 (1080–1630) | 1050 (870–1230) | 6900 (6800–7000) | |
| 7 | 87 | 1.8 | 2.6 | Talc[8] | 8.6 | 150 | 1150 (830–1460) | 740 (610–800) | 5000 (4800–5200) | |
| 8 | 87 | 1.8 | 2.6 | { Mica[9] / Talc[8] } | { 7.6 / 1.0 } | 150 | 1660 (1350–1950) | 830 (700–990) | 5600 (5500–5700) | |
| 9 | 85 | 2 | 3 | Mica[9] | 10 | 130–140 | 1340 (1120–1660) | — | — | |
| 10 | 85 | 2 | 3 | { Mica[9] / Silica[10] } | { 9 / 1 } | 130–140 | 1850 (1400–2280) | — | — | |
| 11 | 85 | 2 | 3 | { Mica[9] / Asbestos[12] } | { 9.5 / 0.5 } | 130–140 | 1470,1620 (1350–1960) | — | — | |
| 12 | 85 | 2 | 3 | Talc[8] | 10 | 130–140 | 1060 (980–1200) | — | — | |
| 13 | 85 | 2 | 3 | Mica[11] | 10 | 150 | 2200 (1700–2750) | 1260 (1180–1310) | 6700 | 1500 |
| 14 | 88 | 2 | 3 | Talc[8] | 10 | 150 | 1500 (1260–2100) | 700 (610–750) | 4800 | 900 |
| 15 | 90 | 2 | 0 | { Mica / Asbestos[12] } | { 2 / 6 } | 130–140 | 1650 | 1200 | 4000 | |

[1]Dicyclopentadiene
[2]0.25"-milled glass fiber, Owens-Corning No. 630
[3]Flexural strength by ASTM D 790-71 on 7"×6"×½" cast plate, cut into 0.75" by 7" specimens.
[4]Tensile strength by ASTM D 638-71A on specimens made per ASTM D 1320-60T
[5]Compressive strength by ASTM.D 695-61T
[6]WO mica sold by Thompson Weinman having 30% >325 mesh
[7]3A mica sold by Thompson Weinman having 4% >325 mesh
[8]Mistron Vapor Talc sold by United Sierra
[9]SeriCite mica sold by Pfizer, Inc., having an average particle size of 15μ
[10]Expanded silica having the trade name Cab-O-Sil
[11]P-80-F mica sold by U.S. Gypsum, 30–40%   325 mesh
[12]Calidria asbestos sold by Union Carbide as No. RG-144
[13]Shear strength by ASTM D 732-46

What is claimed is:

1. A composition comprising 50–98 weight percent sulfur, 0.2 to 20 weight percent sulfur plasticizer, and 5 to 20 weight percent mica.

2. A composition in accordance with claim 1 wherein the amount of mica is 5 to 20 weight percent.

3. A composition in accordance with claim 1 wherein the plasticizer is an aliphatic linear polysulfide; dioctylphthalate; acrylic acid; dicyclopentadiene; tall oil 7. A composition in accordance with claim 1 wherein the mica contains potassium.

8. A composition in accordance with claim 1 wherein the mica is phlogopite.

9. A composition in accordance with claim 1 wherein the mica is muscovite.

* * * * *